United States Patent
Hasegawa et al.

(10) Patent No.: US 11,650,323 B2
(45) Date of Patent: May 16, 2023

(54) METEOROLOGICAL LIDAR

(71) Applicant: EKO INSTRUMENTS CO., LTD., Tokyo (JP)

(72) Inventors: Toshikazu Hasegawa, Tokyo (JP); Eiji Takeuchi, Tokyo (JP); Makoto Tsukamoto, Tokyo (JP); Masanori Yabuki, Kyoto (JP)

(73) Assignee: EKO INSTRUMENTS CO., LTD., Tokyo (JP)

(*) Notice: Subject to any disclaimer, the term of this patent is extended or adjusted under 35 U.S.C. 154(b) by 0 days.

(21) Appl. No.: 17/283,145

(22) PCT Filed: Oct. 15, 2019

(86) PCT No.: PCT/JP2019/040470
§ 371 (c)(1),
(2) Date: Apr. 6, 2021

(87) PCT Pub. No.: WO2020/075869
PCT Pub. Date: Apr. 16, 2020

(65) Prior Publication Data
US 2021/0389471 A1    Dec. 16, 2021

(30) Foreign Application Priority Data

Oct. 12, 2018  (JP) .............................. JP2018-193899

(51) Int. Cl.
*G01J 3/44*        (2006.01)
*G01S 17/95*      (2006.01)
(Continued)

(52) U.S. Cl.
CPC ................ *G01S 17/95* (2013.01); *G01J 3/18* (2013.01); *G01J 3/44* (2013.01); *G01N 21/65* (2013.01); *G01J 3/0227* (2013.01)

(58) Field of Classification Search
CPC ........ G01J 3/28; G01J 3/14; G01J 3/18; G01J 3/02; G01J 3/44; G01N 21/65; A61B 5/0075
See application file for complete search history.

(56) References Cited

U.S. PATENT DOCUMENTS 3,951,526 A * 4/1976 Grossman ................. G01J 3/44
                                                                      359/851
6,583,873 B1 * 6/2003 Goncharov ........ G02B 27/1086
                                                                      356/331
(Continued)

FOREIGN PATENT DOCUMENTS

CN        107179308        9/2017
JP        62-112322        5/1987
(Continued)

OTHER PUBLICATIONS

M. Froidevaux et al., "A new lidar for water vapor and temperature measurements in the Atmospheric Boundary Layer", Asia Flux News letter Issue 28, Mar. 2009, pp. 13-17.
(Continued)

*Primary Examiner* — Abdullahi Nur
(74) *Attorney, Agent, or Firm* — Greenblum & Bernstein, P.L.C.

(57) ABSTRACT

A meteorological lidar performs highly precise meteorological observation by primarily removing elastically scattered light and by detecting rotational Raman-scattered light without filtering it out. The meteorological lidar according to embodiments measures scattered light of a laser beam, and includes: a diffraction grating diffracting rotational Raman-scattered light contained in scattered light in accordance with the wavelength of rotational Raman-scattered light; a detector detecting the diffracted rotational Raman-scattered light; and a removing element primarily removing elastically (Continued)

scattered light of a specific wavelength contained in the scattered light.

11 Claims, 10 Drawing Sheets

(51) Int. Cl.
  *G01J 3/18* (2006.01)
  *G01N 21/65* (2006.01)
  *G01J 3/02* (2006.01)

(56) References Cited

U.S. PATENT DOCUMENTS

| | | | |
|---|---|---|---|
| 2008/0297787 | A1 | 12/2008 | Knebel |
| 2021/0072158 | A1* | 3/2021 | Ilchenko ............... G01J 3/0297 |

FOREIGN PATENT DOCUMENTS

| | | |
|---|---|---|
| JP | 2008-026127 | 2/2008 |
| JP | 2008-503733 | 2/2008 |
| JP | 2002-062197 | 2/2022 |
| WO | 2013/079806 | 6/2013 |
| WO | 2018/146456 | 8/2018 |

OTHER PUBLICATIONS

B. Tatarov et al., "Possibilities of the multi-channel lidar spectrometer technique for investigation of the atmospheric aerosols and pollutions", Proceedings of SPIE, vol. 7860, doi: 10.1117/12.869829, Nov. 16, 2010, pp. 78600C1-78600C-6.

V.M. Mitev, "Lidar Measurement of the Atmospheric Temperature By Rotational Raman Scattering", Acta Physica Polonica, vol. A66, Oct. 1984, pp. 311-322.

International Search Report issued in International Patent Application No. PCT/JP2019/040470, dated Dec. 24, 2019, along with an English translation thereof.

Arshinov Yuri et al. "Daytime operation of a pure rotational Raman lidar by use of a Fabry-Perot interferometer", Applied Optics, vol. 44, No. 17, Jun. 10, 2005 (Jun. 10, 2005), p. 3593.

Balin I. et al. "Simultaneous measurement of atmospheric temperature, humidity, and aerosol extinction and backscatter coefficients by a combined vibrational-pure-rotational Raman lidar", Applied Physics B, vol. 79, No. 6, Oct. 1, 2004 (Oct. 1, 2004), pp. 775-782.

Hayato Kakihara et al., A study on a UV-C Raman lidar for profiling the water vapor, Japan Geoscience Union Meeting 2016, with an English translation thereof.

* cited by examiner

METEOROLOGICAL LIDAR

TECHNICAL FIELD

The present invention relates to a meteorological lidar.

BACKGROUND ART

In view of series of extreme weathers such as local torrential rainfall in recent years, it is desirable to increase the accuracy of weather forecast to allow precautions to be taken by early prediction of abnormal weather conditions. For more accurate weather prediction, it is known to be effective to measure various meteorological elements on the ground surface and to observe the atmosphere using radar, and in addition, to observe vertical distributions of temperature, water vapor concentration, wind direction/wind speed in the atmospheric boundary layer and to enter this data into weather forecasting models when making calculations.

Lidars have been used in recent years as a means of observation of temperature distribution, water vapor concentration, and wind direction/wind speed in the atmosphere. For example, so-called Doppler lidars have been marketed for the measurement of wind direction/wind speed and used for the investigation of wind conditions in the construction of wind farms.

Raman lidars have attracted attention as an observation device for measuring temperature distribution and water vapor concentration in the atmosphere. Raman lidars are an observation device that emits a laser beam of a certain wavelength into the atmosphere and measures Raman-scattered light caused by atmospheric molecules. A Raman lidar that uses the wavelength of 266 nm, for example, which is the fourth order harmonic of YAG laser in the UVC range (wavelengths of 200 to 280 nm), has been known (see Non-Patent Document 1 below). When using laser of this wavelength, the wavelengths of vibrational Raman-scattered light originating from $H_2O$ and $N_2$ in the atmosphere are 295 nm and 284 nm, respectively. Sunlight in the wavelength range of 300 nm or less is absorbed by the ozone layer in the atmosphere (altitude of 10 to 50 km) and hardly reaches the ground surface, i.e., hardly becomes the source of noise. The Raman lidar mentioned above is therefore free of the influence of the sunlight and able to observe the weather during the day, too.

CITATION LIST

Non-Patent Document

Non-Patent Document 1: M. Froidevaux and six others, "A new lidar for water vapor and temperature measurements in the Atmospheric Boundary Layer," Asia Flux News letter Issue 28, 13-17, March 2009

SUMMARY

Technical Problem

Rotational Raman-scattered light, if it is to be measured by a Raman lidar, is very weak, i.e., $10^{-7}$ or less of simultaneously observed elastically scattered light that is other scattered light than that generated by the Raman effect (such as Mie scattered light). Moreover, the wavelengths of rotational Raman-scattered light are very close together, i.e., with a difference of 1 nm or less as compared to the wavelengths of elastically scattered light, and therefore it is difficult to separate rotational Raman-scattered light from elastically scattered light.

Currently marketed Raman lidars extract two rotational Raman-scattered light beams in the short wavelength range by removing rotational Raman-scattered light in the long wavelength range that includes elastically scattered light using optical means such as a mirror after splitting the scattered light with a diffraction grating, and detect an intensity ratio between the two beams to acquire meteorological information such as temperature.

The problem with such a method, which uses only part of rotational Raman-scattered light that is very weak scattered light in the first place, is that the measurement is not made with a high degree of precision because of cross-talks in output signals of detectors detecting adjacent or neighboring wavelengths.

Accordingly an object in the embodiments is to provide a meteorological lidar with a high degree of measurement precision.

Solution to Problem

The meteorological lidar according to one aspect measures scattered light of a laser beam, and includes: a diffraction grating that diffracts rotational Raman-scattered light contained in scattered light; a detector that detects the rotational Raman-scattered light that has been diffracted; and a removing element that primarily removes elastically scattered light contained in the scattered light.

Advantageous Effects of Invention

According to the aspect above, elastically scattered light is primarily removed while rotational Raman-scattered light is not when the latter is detected so that meteorological observation can be performed with a high degree of precision.

DESCRIPTION OF EMBODIMENTS

Preferred embodiments of the present invention (hereinafter "present embodiments") will be hereinafter described with reference to the accompanying drawings (elements given the same reference numerals in each drawing have the same or similar configuration).

(Basic Configuration)

Figure 1:
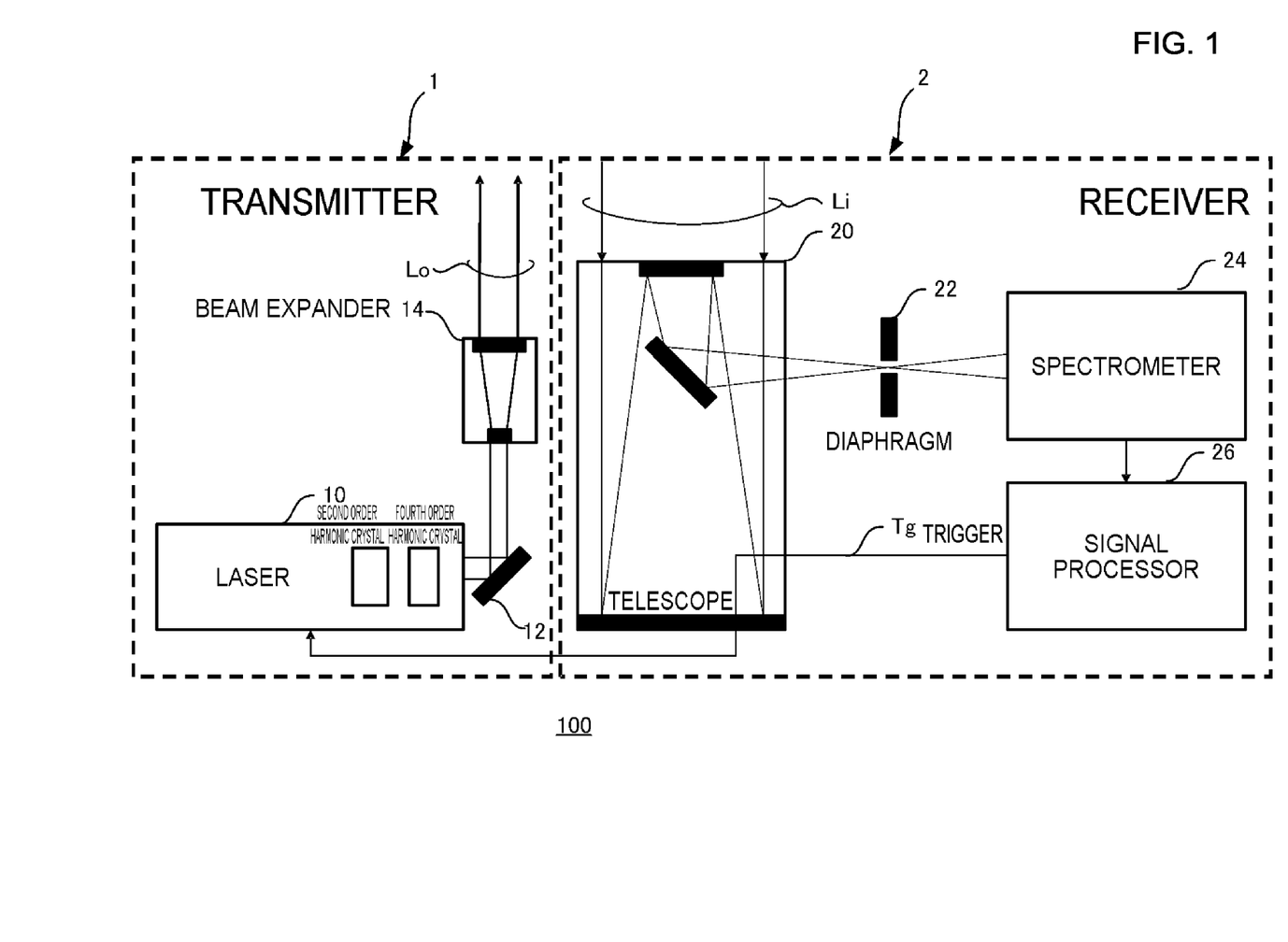
FIG. 1 is a configuration diagram of a meteorological lidar in embodiments.

First, the basic configuration the following embodiments have in common will be described. FIG. 1 illustrates the basic configuration of the meteorological lidar in the present embodiments. As illustrated in FIG. 1, the meteorological lidar 100 of the present embodiments is roughly made up of a transmitter 1 and a receiver 2. The present embodiments relate to specifics of the receiver 2, in particular.

As illustrated in FIG. 1, the transmitter 1 mainly includes a laser 10, a mirror 12, and a beam expander 14. The transmitter 1 is equipped with the function of light emitting means for emitting laser light of a wavelength in the UV range to the atmosphere.

The laser 10 is the light emitting means that emits a laser beam at a predetermined UV wavelength of, e.g., 266 nm by a combination of optical devices such as a second order harmonic crystal and a fourth order harmonic crystal. The wavelength of the laser beam is selected from a range that generates rotational Raman-scattered light by the Raman effect when emitted to the atmospheric components to be measured, such as water vapor ($H_2O$), nitrogen ($N_2$), and oxygen ($O_2$) molecules. The mirror 12 is an optical device that reflects and directs the output laser beam upward. The beam expander 14 is an optical device that enlarges the diameter of the laser beam entering as coherent parallel light and outputs it as exiting light Lo.

The transmitter 1 may be provided with a precision air conditioner that keeps the dust content in a space enclosing part or all of the optical path of the laser beam to a certain level or less. With a precision air conditioner, damage to optical components is reduced and durability can be improved. The transmitter 1 may optionally be provided with a temperature adjusting mechanism that keeps temperature changes of optical components and surrounding space to a certain level or less. Preventing sudden temperature fluctuations of the optical system can also reduce damage to optical components, and can improve durability. The shorter the wavelength, the smaller the laser-induced damage threshold (laser beam density at which damage starts) of optical devices, and generally the more severely the optical devices suffer damage. The configuration described above can realize stable operation of the meteorological lidar using the laser of a wavelength in the UVC range, which is particularly hard to achieve.

The receiver 2 includes a telescope 20, a diaphragm 22, a spectrometer 24, and a signal processor 26. When atmospheric components such as water vapor ($H_2O$), nitrogen ($N_2$), and oxygen ($O_2$) molecules are irradiated with the exiting light Lo emitted from the transmitter 1 described above to the atmosphere, rotational Raman-scattered light is generated by the Raman effect, part of which enters the meteorological lidar 100 as incident light Li. The receiver 2 is equipped with the function of scattered light detection means that detects the rotational Raman-scattered light contained in this incident light Li.

The telescope 20 converges the light beam of incident light Li that has entered. The diaphragm 22 lets the converged incident light Li pass through and filters out unnecessary light components.

The spectrometer 24, which relates to the present invention, splits the light beam and detects rotational Raman-scattered light in the incident light Li, and outputs a detection signal. The spectrometer 24 includes a diffraction grating that diffracts rotational Raman-scattered light contained in scattered light, a detector that detects the diffracted rotational Raman-scattered light, and a removing element that primarily removes elastically scattered light contained in the scattered light, which are optical elements all the embodiments have in common. Specific configurations will be described in detail from Embodiment 1 below onwards with reference to FIG. 2 onwards.

The signal processor 26 analyzes the input of the detection signal acquired by the detection of rotational Raman-scattered light, and determines the components and temperature of the atmosphere that generated the Raman effect, based on the intensities of plural wavelengths of rotational Raman-scattered light.

Embodiment 1

Embodiment 1 relates to an example provided, particularly, with a slit as the removing element mentioned above, which is disposed downstream of a diffraction element to filter out elastically scattered light from the diffracted scattered light.

Figure 2:
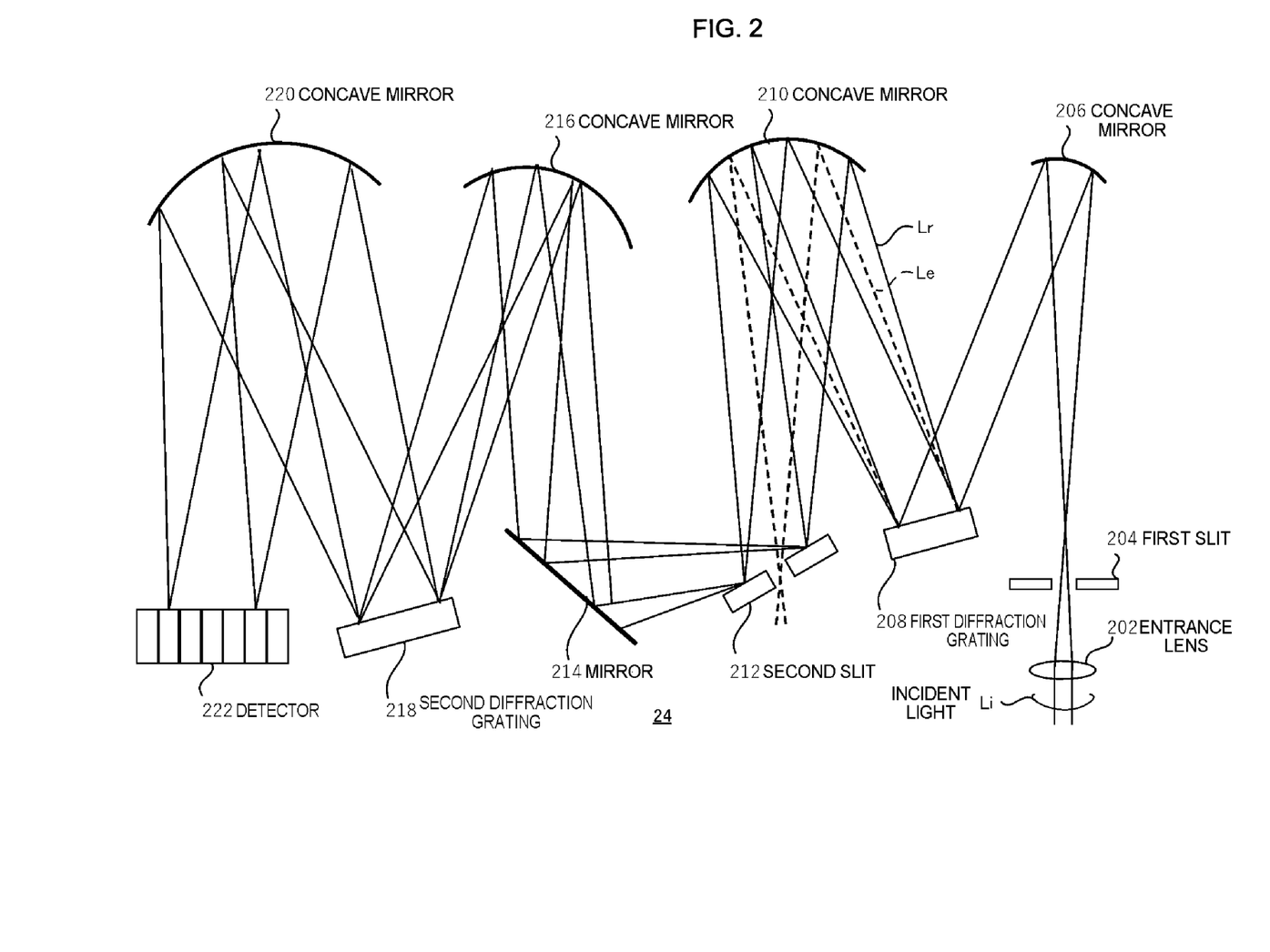
FIG. 2 is a configuration diagram of a temperature measurement spectrometer of the meteorological lidar in Embodiment 1.

FIG. 2 illustrates the configuration of the spectrometer 24 of the meteorological lidar 100 in Embodiment 1. As illustrated in FIG. 2, the spectrometer 24 of Embodiment 1 includes an entrance lens 202, a first slit 204, a concave mirror 206, a first diffraction grating 208, a concave mirror 210, a second slit 212, a mirror 214, a concave mirror 216, a second diffraction grating 218, a concave mirror 220, and a detector 222. The first diffraction grating 208 and second diffraction grating 218 correspond to the diffraction grating mentioned in the foregoing as the common optical element, and likewise the second slit 212 corresponds to the removing element, and the detector 222 corresponds to the detector.

The entrance lens 202 converges the incident light Li that has entered the spectrometer 24. The first slit 204 filters out unnecessary components from the converged incident light Li. The concave mirror 206 converts the incident light Li that diffused as it passed through the first slit 204 into parallel light.

Figure 10:
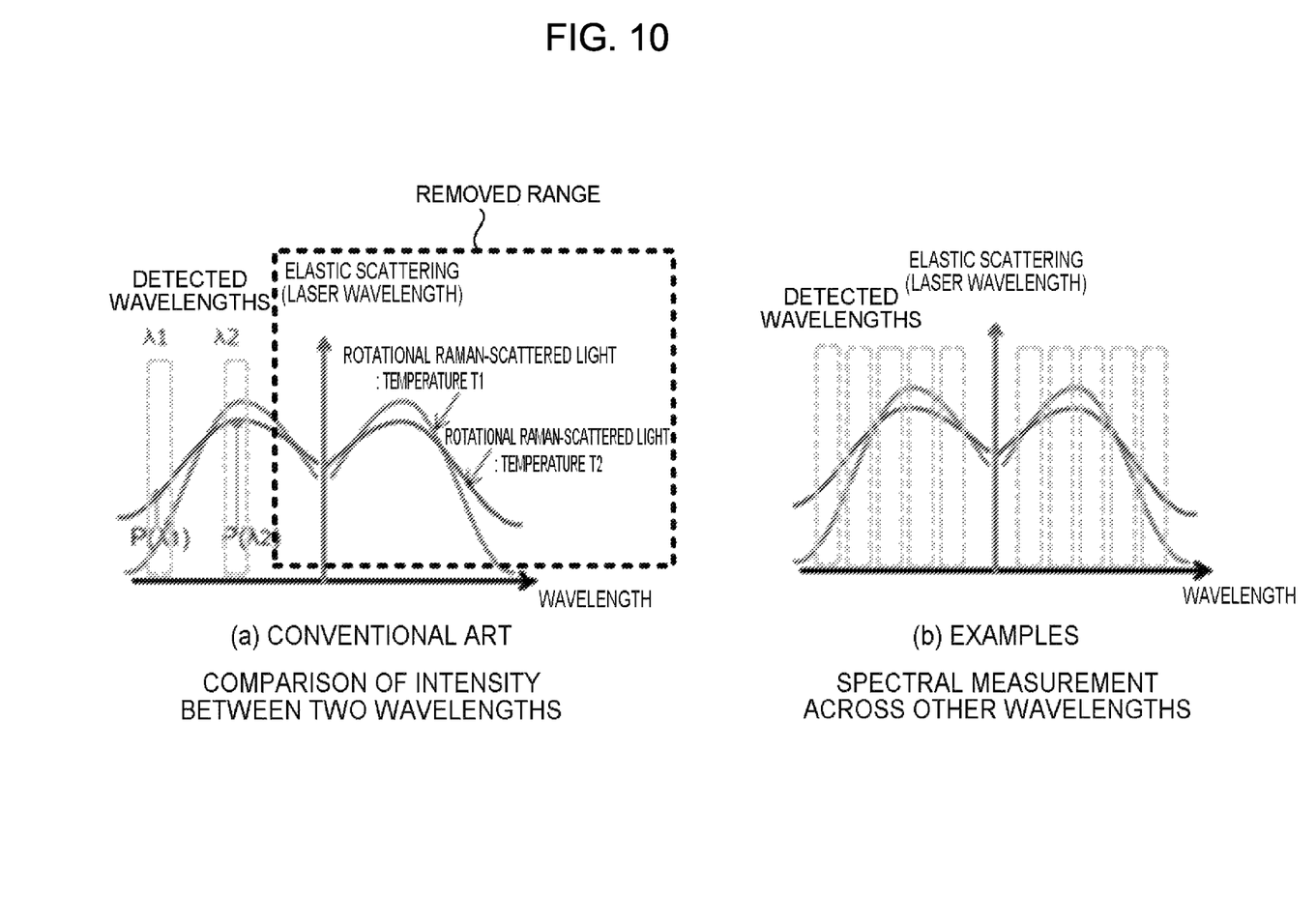
FIG. 10 is a diagram illustrating a spectrum of rotational Raman-scattered light, (a) showing wavelengths as would be detected by an existing technique, and (b) showing wavelengths as detected according to the embodiments.

The first diffraction grating 208 diffracts the incident parallel light in accordance with the wavelength of the rotational Raman-scattered light contained in the incident light Li. The diffracted light output from the first diffraction grating 208 includes rotational Raman-scattered light Lr and elastically scattered light Le. The elastically scattered light Le has the same wavelength as the exiting light Lo output from the transmitter 1 due to the absence of the Raman effect. As illustrated in FIG. 10, the rotational Raman-scattered light Lr includes a range of wavelengths slightly shorter than the wavelength of the exiting light Lo, and a range of wavelengths slightly longer than the wavelength of the exiting light Lo because of the Raman effect. Therefore, the diffracted light from the first diffraction grating 208 is a bundle of rotational Raman-scattered light beams including the elastically scattered light Le having the same wavelength as the exiting light Lo in the center and dispersed over the ranges of shorter and longer wavelengths.

The concave mirror 210 changes the direction of the diffracted light such as to enter into the second slit 212 correctly. The second slit 212 primarily removes the elastically scattered light Le from the incident diffracted light and reflects the remaining rotational Raman-scattered light Lr. The mirror 214 reflects the diffracted light from the second slit 212. The concave mirror 216 causes the diffracted light reflected by the mirror 214 to enter the second diffraction grating 218 as parallel light. The second diffraction grating 218 diffracts the incident diffracted light again in accordance with the wavelength. The concave mirror 220 focuses the diffracted light from the second diffraction grating 218 onto the detector 222.

The detector 222 is preferably configured as an array type detector to be able to detect respective wavelengths of the rotational Raman-scattered light entering different positions. The detected rotational Raman-scattered light is output as a detection signal.

In a conventional meteorological lidar, in order to remove the elastically scattered light Le having the same wavelength as that of the emitted exiting light Lo from the incident light Li having a spectrum such as the one illustrated in FIG. 10(a), a wide range including not only the elastically scattered light but also plural wavelengths of rotational Raman-scattered light differing from the wavelength of the elastically scattered light Le was removed, and only two wavelengths $\lambda 1$ and $\lambda 2$ slightly shorter than that of the elastically scattered light Le were detected as rotational Raman-scattered light. In this regard, according to Embodiment 1, with the use of a slit as the removing element, the elastically scattered light Le is primarily removed as illustrated in FIG. 10(b), so that a wide range of rotational Raman-scattered light including wavelengths shorter and longer than the wavelength of the elastically scattered light Le is detected. Therefore a highly precise detection signal can be output based on multiple wavelengths of rotational Raman-scattered light.

Embodiment 2

Embodiment 2 differs from previously described Embodiment 1 particularly in that an analyzer is further provided for attenuating the elastically scattered light in the scattered light.

Figure 3:
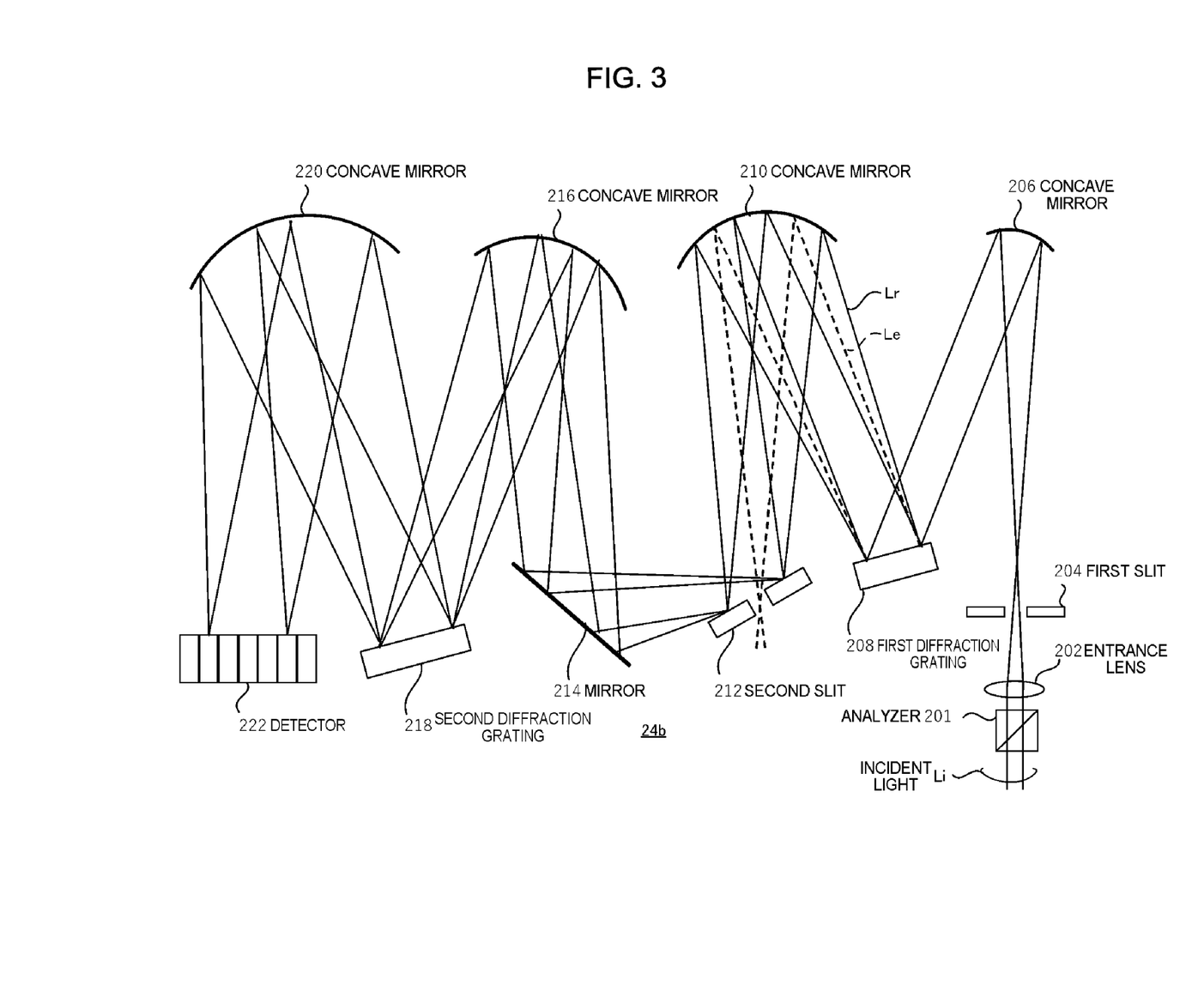
FIG. 3 is a configuration diagram of a temperature measurement spectrometer of the meteorological lidar in Embodiment 2.

FIG. 3 illustrates a configuration of the spectrometer 24b of the meteorological lidar 100 in Embodiment 2. As illustrated in FIG. 3, the spectrometer 24b of Embodiment 2 includes an analyzer 201 upstream of the entrance lens 202. A mirror 211 is disposed instead of the second slit 212. Other constituent elements are the same as those of the previously described Embodiment 1, which are given the same reference numerals and will not be described again.

The analyzer 201 has the function of attenuating the elastically scattered light Le in the incident scattered light, i.e., incident light Li. Any known optical device such as a polarizer or birefringent crystal can be applied as the analyzer 201.

Polarization of rotational Raman-scattered light that is the measurement target light is cancelled generally to a degree of several tens percent, while polarization cancellation of the elastically scattered light is 1% or less. According to Embodiment 2 in which the analyzer 201 is disposed such as to eliminate elastically scattered light, the elastically scattered light can be reduced even more effectively. The analyzer of this embodiment can be similarly applicable to the following embodiments.

Embodiment 3

Embodiment 3 differs from the previously described embodiments particularly in that a notch filter is used as the removing element.

Figure 4:
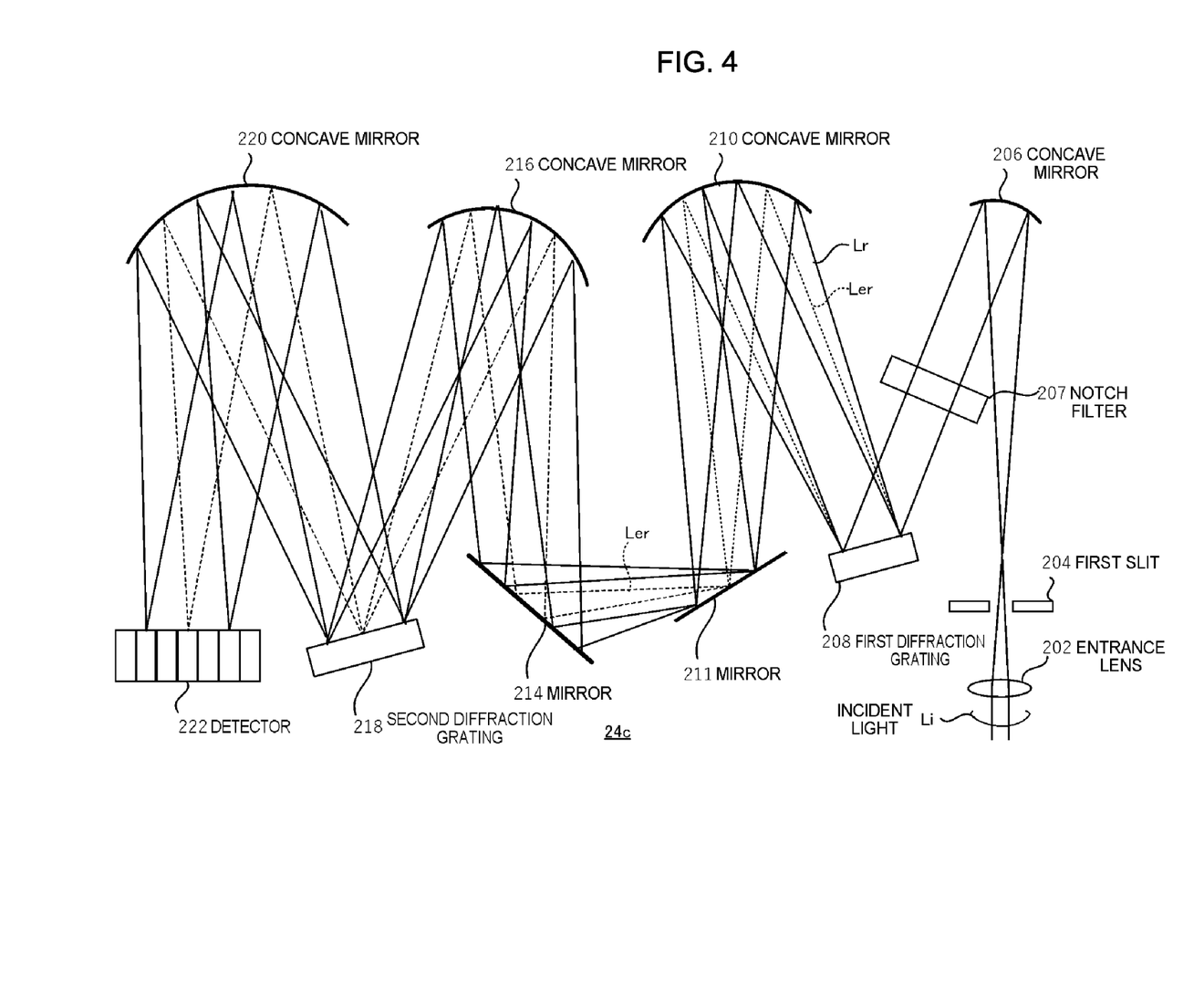
FIG. 4 is a configuration diagram of a temperature measurement spectrometer of the meteorological lidar in Embodiment 3.

FIG. 4 illustrates a configuration of the spectrometer 24c of the meteorological lidar 100 in Embodiment 3. As illustrated in FIG. 4, the spectrometer 24c of Embodiment 3 includes a notch filter 207 upstream of the first diffraction grating 208. Other constituent elements are the same as those of the previously described Embodiment 1, which are given the same reference numerals and will not be described again. The first diffraction grating 208 and second diffraction grating 218 correspond to the diffraction grating mentioned in the foregoing as the common optical element, and likewise the notch filter 207 corresponds to the removing element, and the detector 222 corresponds to the detector.

The notch filter 207 is an optical device having a filtering function that stops or reduces passage of light of a specific wavelength, i.e., elastically scattered light Le here, and any known device can be applied.

According to Embodiment 3 in which a notch filter is used as the removing element, the elastically scattered light Le is primarily removed so that a highly precise detection signal can be output. Depending on the properties of the notch filter 207, remnant elastically scattered light Ler that could not be removed may enter the detector 222 as illustrated in FIG. 4. Such remnant elastically scattered light Ler can be blocked or attenuated, or stopped or reduced by a mask or a notch filter to be described in Embodiment 7 and Embodiment 8, respectively.

Embodiment 4

Embodiment 4 differs from the previously described embodiments particularly in that a band-pass filter is used as the removing element.

Figure 5:
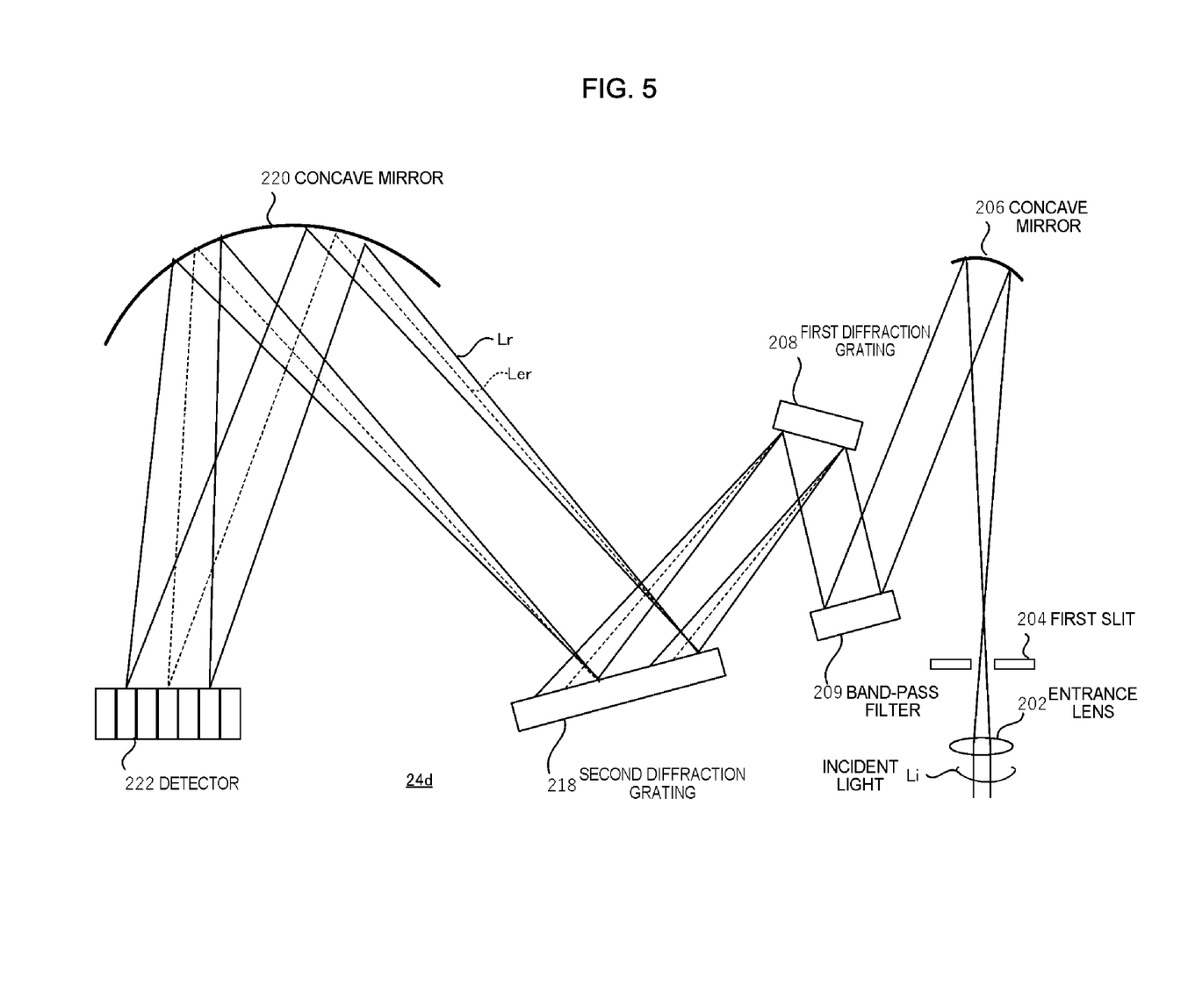
FIG. 5 is a configuration diagram of a temperature measurement spectrometer of the meteorological lidar in Embodiment 4.

FIG. 5 illustrates a configuration of the spectrometer 24d of the meteorological lidar 100 in Embodiment 4. As illustrated in FIG. 5, the spectrometer 24d of Embodiment 4 includes a band-pass filter 209 upstream of the first diffraction grating 208. Other constituent elements are the same as those of the previously described Embodiment 1, which are given the same reference numerals and will not be described again. Note, the concave mirror 210, second mirror 212, mirror 214, and concave mirror 216 of the constituent elements of Embodiment 1 are removed. The first diffraction grating 208 and second diffraction grating 218 correspond to the diffraction grating mentioned in the foregoing as the common optical element, and likewise the band-pass filter 209 corresponds to the removing element, and the detector 222 corresponds to the detector.

According to Embodiment 4 in which a band-pass filter is used as the removing element, the elastically scattered light Le is primarily removed so that a highly precise detection signal can be output. The same function as that of the previously described embodiments can be achieved without some other optical elements such as a mirror or concave mirror. Depending on the properties of the band-pass filter 209, remnant elastically scattered light Ler that could not be removed may enter the detector 222 as illustrated in FIG. 5. Such remnant elastically scattered light Ler can be blocked or attenuated, or stopped or reduced by a mask or a notch filter to be described in Embodiment 7 and Embodiment 8, respectively.

Embodiment 5

Embodiment 5 relates particularly to a variation example in which a notch filter is used as the removing element.

Figure 6:
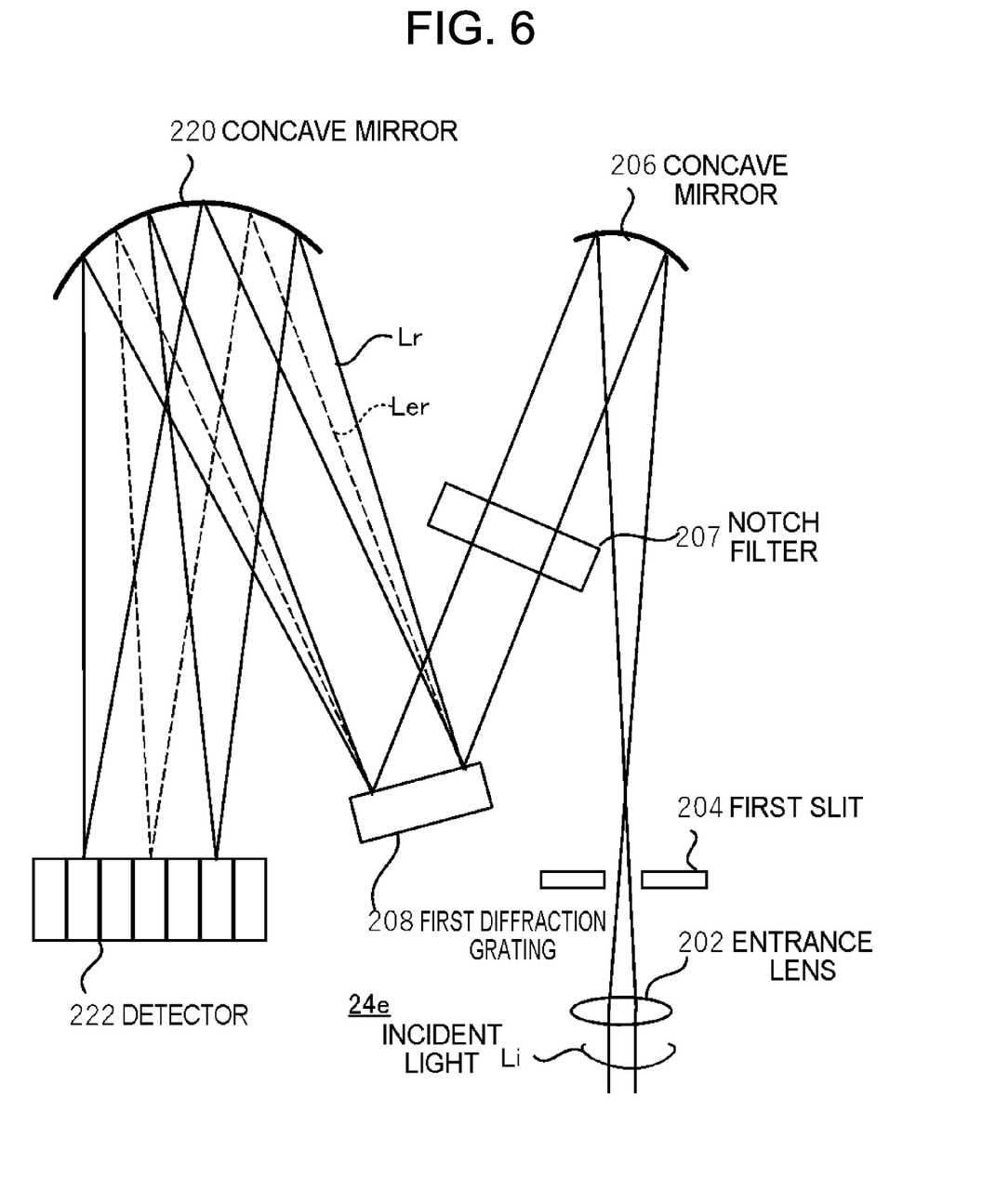
FIG. 6 is a configuration diagram of a temperature measurement spectrometer of the meteorological lidar in Embodiment 5.

FIG. 6 illustrates a configuration of the spectrometer 24e of the meteorological lidar 100 in Embodiment 5. As illustrated in FIG. 6, the spectrometer 24e of Embodiment 5 includes a notch filter 207 upstream of the first diffraction grating 208 as with Embodiment 3. The concave mirror 210, mirror 211, mirror 214, concave mirror 216, and second diffraction grating 218 of the constituent elements downstream of the first diffraction grating 208 are removed. The first diffraction grating 208 corresponds to the diffraction grating mentioned in the foregoing as the common optical element, and likewise the notch filter 207 corresponds to the removing element, and the detector 222 corresponds to the detector.

According to Embodiment 5 in which a notch filter is used as the removing element, the elastically scattered light Le is primarily removed so that a highly precise detection signal can be output. The same function as that of the previously described embodiments can be achieved without some other optical elements such as a mirror or concave mirror. Depending on the properties of the notch filter 207, remnant elastically scattered light Ler that could not be removed may enter the detector 222 as illustrated in FIG. 6. Such remnant elastically scattered light Ler can be blocked or attenuated, or stopped or reduced by a mask or a notch filter to be described in Embodiment 7 and Embodiment 8, respectively.

Embodiment 6

Embodiment 6 relates particularly to a variation example in which a band-pass filter is used as the removing element.

Figure 7:
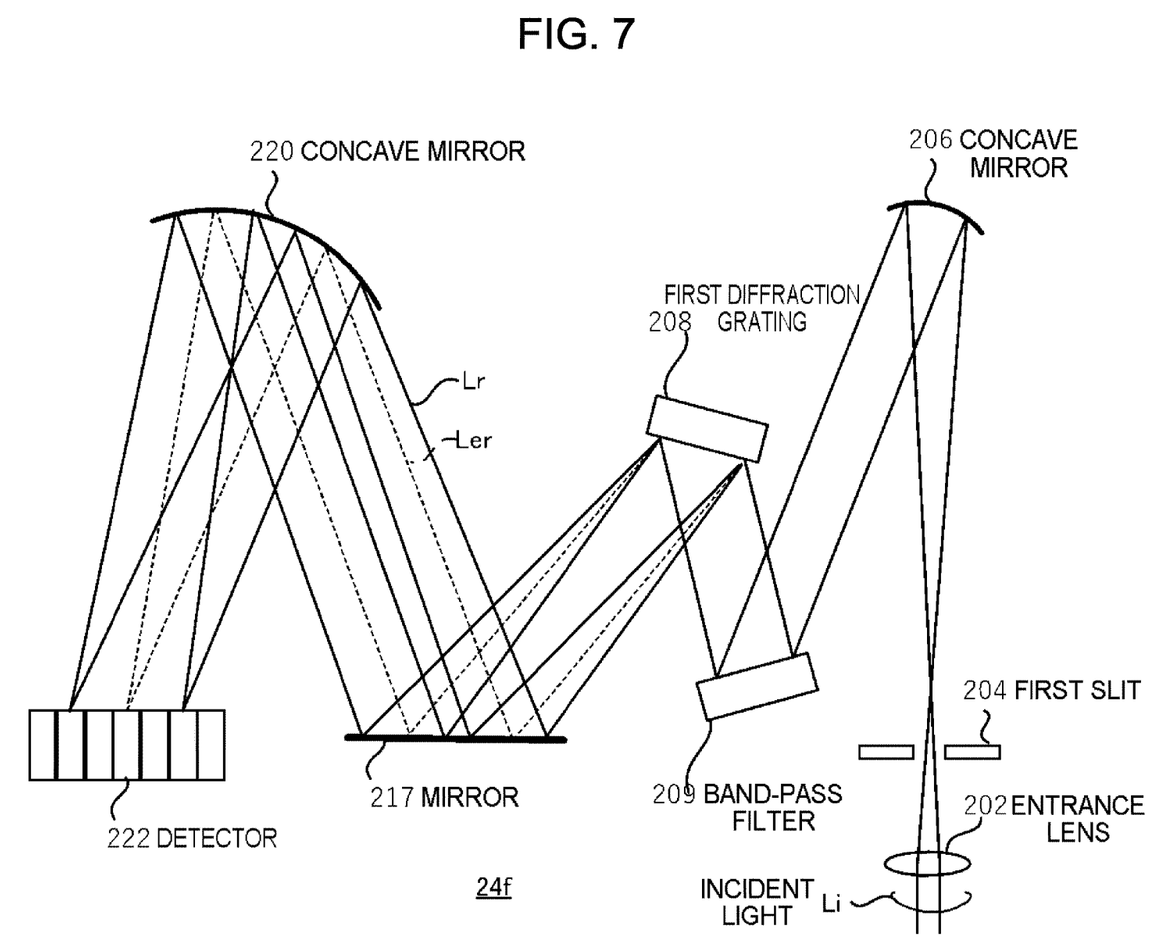
FIG. 7 is a configuration diagram of a temperature measurement spectrometer of the meteorological lidar in Embodiment 6.

FIG. 7 illustrates a configuration of the spectrometer 24f of the meteorological lidar 100 in Embodiment 6. As illustrated in FIG. 7, the spectrometer 24f of Embodiment 6 includes a band-pass filter 209 upstream of the first diffraction grating 208 as with Embodiment 4, but differs from Embodiment 4 in that a mirror 217 is disposed instead of the second diffraction grating 218 in the constituent elements downstream of the first diffraction grating 208. The first diffraction grating 208 corresponds to the diffraction grating mentioned in the foregoing as the common optical element, and likewise the band-pass filter 209 corresponds to the removing element, and the detector 222 corresponds to the detector.

The notch filter described previously in Embodiment 5 may be used in combination with the band-pass filter of this embodiment.

According to Embodiment 6 in which a band-pass filter is used as the removing element, the elastically scattered light Le is primarily removed so that a highly precise detection signal can be output. The same function as that of the previously described embodiments can be achieved without the additional second diffraction grating. Depending on the properties of the band-pass filter 209, remnant elastically scattered light Ler that could not be removed may enter the detector 222 as illustrated in FIG. 7. Such remnant elastically scattered light Ler can be blocked or attenuated, or stopped or reduced by a mask or a notch filter to be described in Embodiment 7 and Embodiment 8, respectively.

Embodiment 7

Embodiment 7 differs from the previously described embodiments particularly in that a mask is provided.

Figure 8:
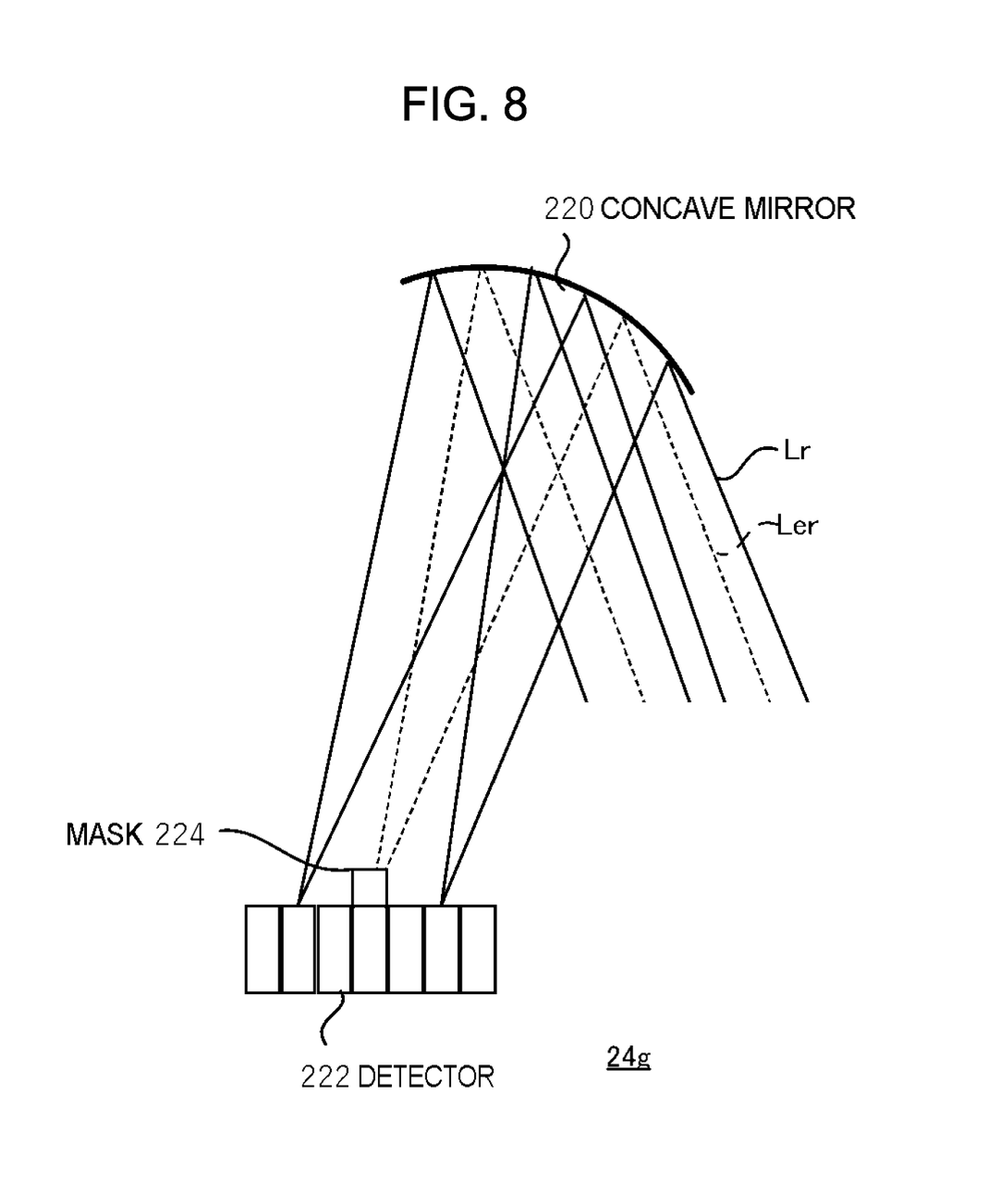
FIG. 8 is a configuration diagram of a temperature measurement spectrometer of the meteorological lidar in Embodiment 7.

FIG. 8 illustrates a configuration of the spectrometer 24g of the meteorological lidar 100 in Embodiment 7. As illustrated in FIG. 8, the spectrometer 24g differs from the previously described embodiments in that a mask 224 is provided on an entrance surface of the detector 222. The configuration upstream of the concave mirror 220 is not illustrated in FIG. 8. Various configurations of the previously described embodiments can be applied as required.

The mask 224 is light blocking means that blocks or attenuates elastically scattered light Le remaining in the light entering the detector 222 to be detected. A known material having a light blocking function can be applied as the mask 224.

The detector 222 should preferably be an array type detector because of the need to acquire the intensity of each wavelength of the rotational Raman-scattered light Lr. While it is possible to substantially remove elastically scattered light by the spectrometer 24 described in each foregoing embodiment before the light reaches the detector 222, a certain proportion of elastically scattered light Le reaches the detector 222 depending on the properties of the optical devices. Such remnant elastically scattered light Le will be the source of noise as it mixes into rotational Raman signals detected by individual detector elements adjacent each other in the array type detector.

According to Embodiment 7 in which the mask 224 is provided to a location on the array-type detector where elastically scattered light enters, the effect of remnant elastically scattered light can be reduced and an even more precise detection signal can be output.

Embodiment 8

Embodiment 8 differs from Embodiment 7 above in that a notch filter is provided instead of the mask.

Figure 9:
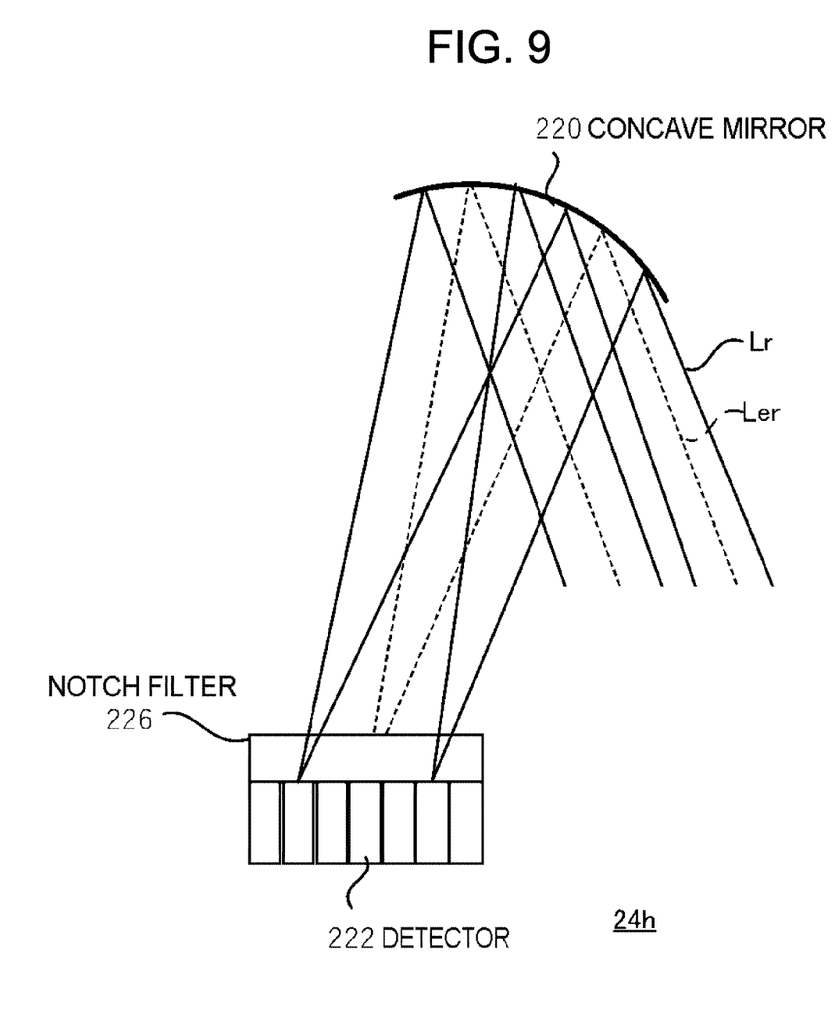
FIG. 9 is a configuration diagram of a temperature measurement spectrometer of the meteorological lidar in Embodiment 8.

FIG. 9 illustrates a configuration of the spectrometer 24h of the meteorological lidar 100 in Embodiment 8. As illustrated in FIG. 9, the spectrometer 24h differs from Embodiment 7 above in that a notch filter 226 is provided on an entrance surface of the detector 222. The configuration upstream of the concave mirror 220 is not illustrated in FIG. 9. Various configurations of the previously described embodiments can be applied as required.

The notch filter 226 is filtering means that stops or reduces passage of elastically scattered light Le remaining in the light entering the detector 222 to be detected. A known material having a filtering function can be applied as the notch filter 226.

According to Embodiment 8 in which the notch filter 226 is provided immediately upstream of the detector 222, the effect of remnant elastically scattered light can be reduced and an even more precise detection signal can be output.

Other Variation Examples

The embodiments described above are given for facilitating the understanding of the present invention and not for limiting the interpretation of the present invention. Various elements in the embodiments, their arrangements, materials, conditions, shapes, sizes and so on are not limited to the illustrated examples and may be changed as required. Also, various features illustrated in different embodiments can be partially interchanged or combined.

While the wavelength of 266 nm is preferable, more or less the same effects would be achieved with the use of a laser beam of a longer wavelength. Examples of longer wavelengths include 355 nm, and 532 nm, the third order harmonic and second order harmonic of YAG laser, respectively, and 248 nm, 308 nm, and 351 nm of excimer laser.

REFERENCE SIGNS LIST

1 Transmitter
2 Receiver
24, 24b to 24h Spectrometer
201 Analyzer
202 Entrance lens
204 First slit
206, 210, 216, 220 Concave mirror
207, 226 Notch filter
208 First diffraction grating
209 Band-pass filter
211, 214, 217 Mirror
212 Second slit
218 Second diffraction grating
222 Detector
224 Mask
100 Meteorological lidar

What is claimed is:

1. A meteorological lidar, comprising:
a transmitter that includes a laser that emits a laser beam; and
a receiver that receives incident light from the laser beam, the receiver including
a spectrometer that measures scattered light of the laser beam, the spectrometer including
a diffraction grating that diffracts rotational Raman-scattered light contained in the scattered light of the laser beam,
a detector that detects the rotational Raman-scattered light that has been diffracted by the diffraction grating, including a plurality of wavelengths shorter than the wavelength of the elastically scattered light and a plurality of wavelengths longer that the wavelength of the elastically scattered light, wherein the meteorological lidar performs temperature measurement based on the detected rotational Raman-scattered light,
a removing element configured to primarily remove elastically scattered light contained in the scattered light of the laser beam without removing a wide range of the rotational Raman-scattered light including wavelengths shorter and longer than a wavelength of the elastically scattered light, and
a signal processor that analyzes signals from the spectrometer.

2. The meteorological lidar according to claim 1, wherein the removing element is a slit disposed downstream of the diffraction grating, the slit removing the elastically scattered light from the scattered light that has been diffracted.

3. The meteorological lidar according to claim 1, wherein the removing element is a notch filter disposed upstream of the diffraction grating, the notch filter stopping or reducing passage of the elastically scattered light in the scattered light.

4. The meteorological lidar according to claim 1, wherein the removing element is a band-pass filter disposed upstream of the diffraction grating, the band-pass filter stopping or reducing reflection of the elastically scattered light in the scattered light.

5. The meteorological lidar according to claim 1, further comprising:
an analyzer that attenuates the elastically scattered light in the scattered light.

6. The meteorological lidar according to claim 1, further comprising:
an additional diffraction grating that further diffracts diffracted light that has been diffracted by the diffraction grating.

7. The meteorological lidar according to claim 1, wherein the detector is an array type detector.

8. The meteorological lidar according to claim 1, further comprising:
a mask that blocks or attenuates the elastically scattered light remaining in light entering the detector to be detected.

9. The meteorological lidar according to claim 1, further comprising:
a notch filter that stops or reduces passage of the elastically scattered light remaining in light entering the detector to be detected.

10. The meteorological lidar according to claim 1, further comprising:
one or more concave mirrors along an optical path.

11. The meteorological lidar according to claim 1, further comprising:
one or more flat mirrors along an optical path.

* * * * *

UNITED STATES PATENT AND TRADEMARK OFFICE
CERTIFICATE OF CORRECTION

| | |
|---|---|
| PATENT NO. | : 11,650,323 B2 |
| APPLICATION NO. | : 17/283145 |
| DATED | : May 16, 2023 |
| INVENTOR(S) | : T. Hasegawa et al. |

It is certified that error appears in the above-identified patent and that said Letters Patent is hereby corrected as shown below:

In the Claims

Column 9, Line 35 (Claim 1), please change "longer that" to --longer than--.

Signed and Sealed this
Third Day of October, 2023

*Katherine Kelly Vidal*

Katherine Kelly Vidal
*Director of the United States Patent and Trademark Office*